United States Patent
Aslam et al.

(10) Patent No.: US 9,213,645 B2
(45) Date of Patent: Dec. 15, 2015

(54) COMMAND AWARE PARTIAL PAGE PROGRAMMING

(75) Inventors: Ameen Aslam, Santa Clara, CA (US); Krishna Dhulipala, Fremont, CA (US)

(73) Assignee: Sandisk Technologies Inc., Plano, TX (US)

(*) Notice: Subject to any disclaimer, the term of this patent is extended or adjusted under 35 U.S.C. 154(b) by 18 days.

(21) Appl. No.: 13/340,478

(22) Filed: Dec. 29, 2011

(65) Prior Publication Data

US 2013/0173845 A1  Jul. 4, 2013

(51) Int. Cl.
*G06F 12/00* (2006.01)
*G06F 12/08* (2006.01)

(52) U.S. Cl.
CPC ...... *G06F 12/0871* (2013.01); *G06F 2212/222* (2013.01); *G06F 2212/466* (2013.01)

(58) Field of Classification Search
CPC .............. G06F 2212/2022; G06F 2212/205; G06F 12/0246; G06F 12/0866; G06F 11/1008; G06F 11/1068; G06F 11/1076; G06F 11/108
USPC .......... 711/103, 154, E12.008, E12.017, 170, 711/173, 171
See application file for complete search history.

(56) References Cited

U.S. PATENT DOCUMENTS

| | | | |
|---|---|---|---|
| 7,181,572 B2 | 2/2007 | Walmsley | |
| 7,660,945 B1 * | 2/2010 | Lee et al. ...................... | 711/113 |
| 8,332,574 B2 * | 12/2012 | Lasser et al. .................. | 711/103 |
| 8,447,919 B1 * | 5/2013 | Agarwal et al. ............... | 711/103 |
| 2008/0059690 A1 * | 3/2008 | Mittal et al. .................. | 711/103 |
| 2008/0172427 A1 * | 7/2008 | Ito ................................. | 707/205 |
| 2008/0183949 A1 | 7/2008 | Ly et al. | |
| 2008/0244164 A1 | 10/2008 | Chang et al. | |
| 2009/0150756 A1 * | 6/2009 | Mori et al. ..................... | 714/807 |
| 2010/0017562 A1 * | 1/2010 | Nagadomi ..................... | 711/103 |
| 2010/0030945 A1 * | 2/2010 | Yuan et al. .................... | 711/103 |
| 2010/0042774 A1 * | 2/2010 | Yang et al. .................... | 711/103 |
| 2010/0161888 A1 * | 6/2010 | Eggleston ...................... | 711/103 |
| 2010/0172180 A1 | 7/2010 | Paley et al. | |
| 2010/0174847 A1 * | 7/2010 | Paley et al. ................... | 711/103 |
| 2011/0119562 A1 * | 5/2011 | Steiner et al. ................. | 714/766 |
| 2011/0252185 A1 * | 10/2011 | Arya .............................. | 711/103 |
| 2011/0320685 A1 * | 12/2011 | Gorobets et al. ............. | 711/103 |
| 2011/0320692 A1 * | 12/2011 | Maeda et al. ................. | 711/103 |
| 2013/0054873 A1 * | 2/2013 | Belluomini et al. .......... | 711/103 |

* cited by examiner

*Primary Examiner* — Sanjiv Shah
*Assistant Examiner* — Edward Waddy, Jr.
(74) *Attorney, Agent, or Firm* — Brinks Gilson & Lione (57) ABSTRACT

A method and system for partial page programming in a storage device is disclosed. An amount of data for partial page programming is determined. The amount may include host data (such as host data in a host command sent from a host device) and/or binary cache index data. The write step, used for partial page programming, is dynamically set based on the determined amount of data for partial page programming. In this way, the write step for partial page programming is dynamic rather than fixed. Further, dynamically setting the write step may reduce the number of programming steps for storing the host data in the host command and may reduce padding when partial page programming, thereby leaving less invalid data inside a block.

22 Claims, 11 Drawing Sheets

PRIOR ART

| 4K BCI | 4K Data | 4K Data |
|--------|---------|---------|

- PPP write step size of 4KB
  - Host data is 8KB
  - Number of programming steps: 3

*FIG. 3A*

PRIOR ART

| 4K Pre-pad | 4K BCI | 8K Data |
|------------|--------|---------|

- PPP write step size of 8kB
  - Host data is 8kB
  - Number of programming steps: 2

*FIG. 3B*

| 4K BCI | 4K Data | 4K BCI | 1 sector + 3.5K Pad | 4K BCI | 4K Data |
|---|---|---|---|---|---|
| Step 1 | Step 2 | Step 3 | Step 4 | Step 5 | Step 6 |

| Step 1 | Step 2 | Step 3 | Step 4 |
|---|---|---|---|
| 4K BCI + 4K Data | 4K BCI + 1 sector + 1.5K Pad | 2K Data | 2K Data + 4K BCI |

| Metric | PPP Step = 8KB | PPP Step = 4KB | % increase with smaller PPP step |
|---|---|---|---|
| SS Random Write (Iops) | 182 | 186 | 2 |
| 1kB Random Write (Iops) | 177 | 185 | 5 |
| 2kB Random Write (Iops) | 132 | 140 | 6 |
| 4kB Random Write (Iops) | 50 | 58 | 16 |

*FIG. 8*

COMMAND AWARE PARTIAL PAGE PROGRAMMING

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device.

Flash memory can be organized in different ways, including segmenting the memory into blocks and pages, with the blocks being composed of multiple pages. For example, a single 4 MB memory block may be composed of multiple pages. The total number of pages and blocks may vary depending on the actual capacity of the device.

The basic programming unit of the flash memory is typically a page. For example, in flash memories using a binary cache (BC), the atomic unit of programming is the physical page. However, there are instances in which the flash memory may program in smaller portions of a page, such as by using partial page programming. For example, partial page programming programs may program the flash memory in granularity as small as an Error Correction coding (ECC) page. In particular, partial page programming uses the concept of a "write step", which is the maximum programming step size as a multiple of ECC page. This allows for partial page programming to program an amount that is a multiple of the ECC page, but is less than an entire page.

SUMMARY

A method and system for partial page programming is disclosed.

In one aspect, a storage device is provided. The storage device comprises: a memory and a controller in communication with the memory. The controller is configured to: determine an amount to write by partial page programming; dynamically set a write step based on the determined amount; and perform the partial page programming in the memory with the dynamically set write step.

There are different types of data that may be written using partial page programming, such as host data that is received from a host device, and binary cache index data. The controller may determine the amount to write by partial page programming by receiving the host data from the host device and determining an amount of the host data (such as by examining a host command from the host device that includes the host data). The controller may also determine the amount to write by partial page programming by determining whether the binary cache index data needs to be written to the memory.

The controller may select the write step from a plurality of predetermined write steps based on the amount to write by partial page programming. The predetermined write steps may be multiples of the Error Correction coding (ECC) page. The controller may select a single write step to program the entire amount to write by partial page programming. For example, the controller may select the predetermined write step that is closest to but not less than the amount to write by partial page programming. Or, the controller may select multiple write steps to program the amount to write by partial page programming (such as one write step to program the host data and another write step to program the binary cache index data).

In another aspect, a method for partial page programming in a memory of a storage device is disclosed. The method comprises: determining an amount to write by the partial page programming; dynamically setting a write step based on the determined amount; and performing the partial page programming in the memory with the dynamically set write step.

Embodiments of the present invention are defined by the claims, and nothing in this section should be taken as a limitation on those claims. Other features and advantages will become apparent upon review of the following drawings, detailed description and claims. Additionally, other embodiments are disclosed, and each of the embodiments can be used alone or together in combination. The embodiments will now be described with reference to the attached drawings.

DETAILED DESCRIPTION

Figure 1:
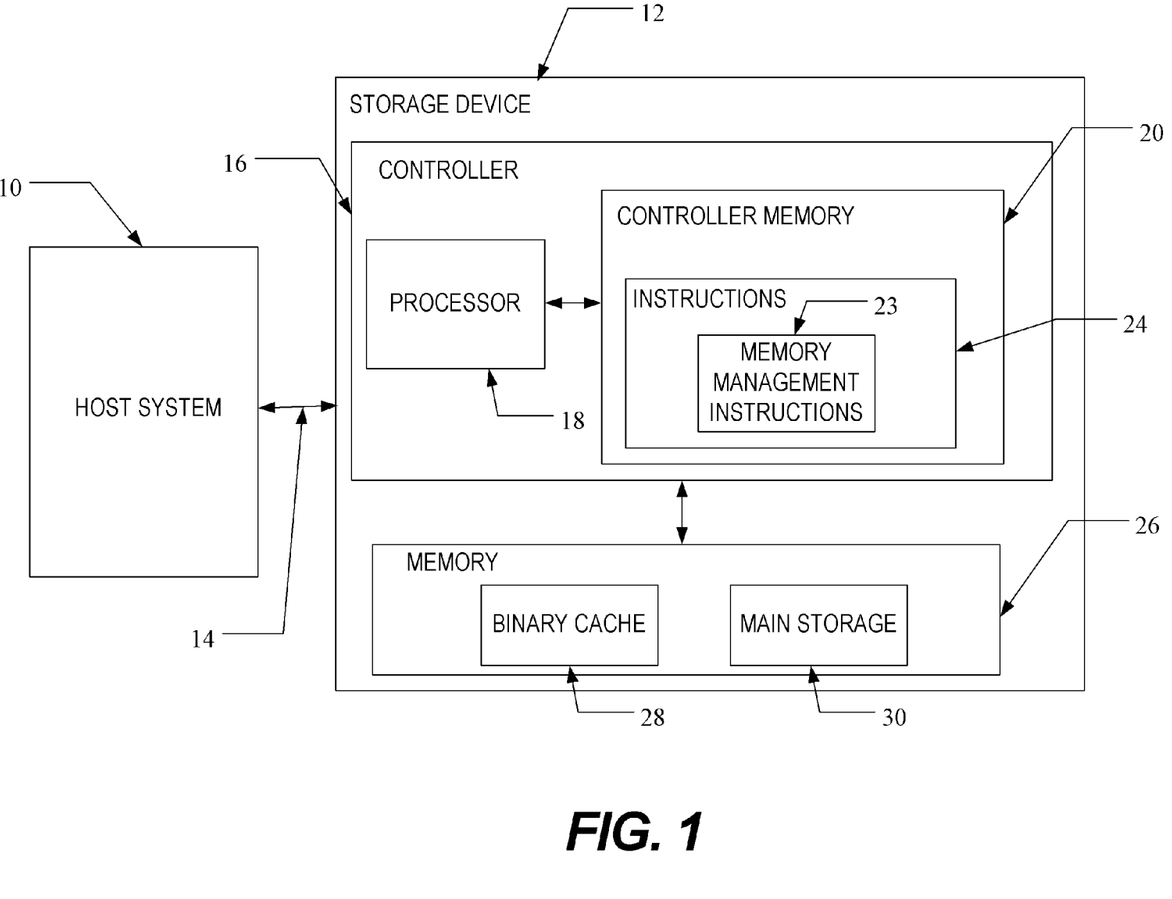
FIG. 1 is a block diagram of a memory system.

A flash memory system suitable for use in implementing aspects of the invention is shown in FIG. 1. A host system 10 stores data into, and retrieves data from, a storage device 12. The storage device 12 may be embedded in the host system 10 or may exist in the form of a card or other removable drive that is removably connected to the host system 10 through a mechanical and electrical connector. The host system 10 may be any of a number of data generating devices, such as a personal computer, a mobile telephone, a personal digital assistant (PDA), or the like. The host system 10 communicates with the storage device over a communication channel 14.

The storage device 12 contains a controller 16 and a memory 26. As shown in FIG. 1, the controller 16 includes a processor 18 and a controller memory 20. The processor 18 may comprise a microprocessor, a microcontroller, an application specific integrated circuit (ASIC), a field programmable gate array, a logical digital circuit, or other now known or later developed logical processing capability. The controller memory 20 may include volatile and/or non-volatile memory and instructions 24.

The memory 26 may include non-volatile memory (such as flash memory). The flash memory may be composed of memory cells. The memory cells may be operated to store two levels of charge so that a single bit of data is stored in each cell. This is typically referred to as a binary or single level cell (SLC) memory. Alternatively or in addition, the memory cells may be operated to store more than two detectable levels of charge in each charge storage element or region, thereby to store more than one bit of data in each. This latter configuration is referred to as multi-level cell (MLC) memory. As illustrated in FIG. 1, memory 26 may include binary cache 28

(which may include SLC type of flash configuration) and main storage 30 (which may include MLC type of flash configuration).

The storage device 12 may include the functions for a memory management. In operation, the processor 18 may execute memory management instructions 23 (which may be resident in instructions 24) for operation of the partial page programming functions, such as detailed in FIG. 5. One example of memory management instructions 23 may comprise Media Management Layer (MML) firmware. The MML firmware may implement functionality, such as described in FIGS. 5-6, discussed in more detail below.

The memory 26 may comprise one or more integrated circuit chips, where each chip may contain an array of memory cells. Data are transferred into and out of the chip through respective data input/output circuits that are connected with a system bus. Circuitry on the chip may provide for both programming data into the memory cells and for reading data from the memory cells of their respective planes. Each memory chip may contain some controlling circuitry that executes commands from the controller 16 to perform such functions. For example, the controller 16, executing the memory management instructions 23, may generate commands for the chip to perform the functionality described in FIGS. 5-6.

One or more types of data may be cached in storage device 12. One type of data that may be cached in the storage device 12 is host data, which is data sent to and/or received from the host device 10. Another type of data that may be cached in the storage device 12 is control data. Other types of data for caching are contemplated.

Figure 2:
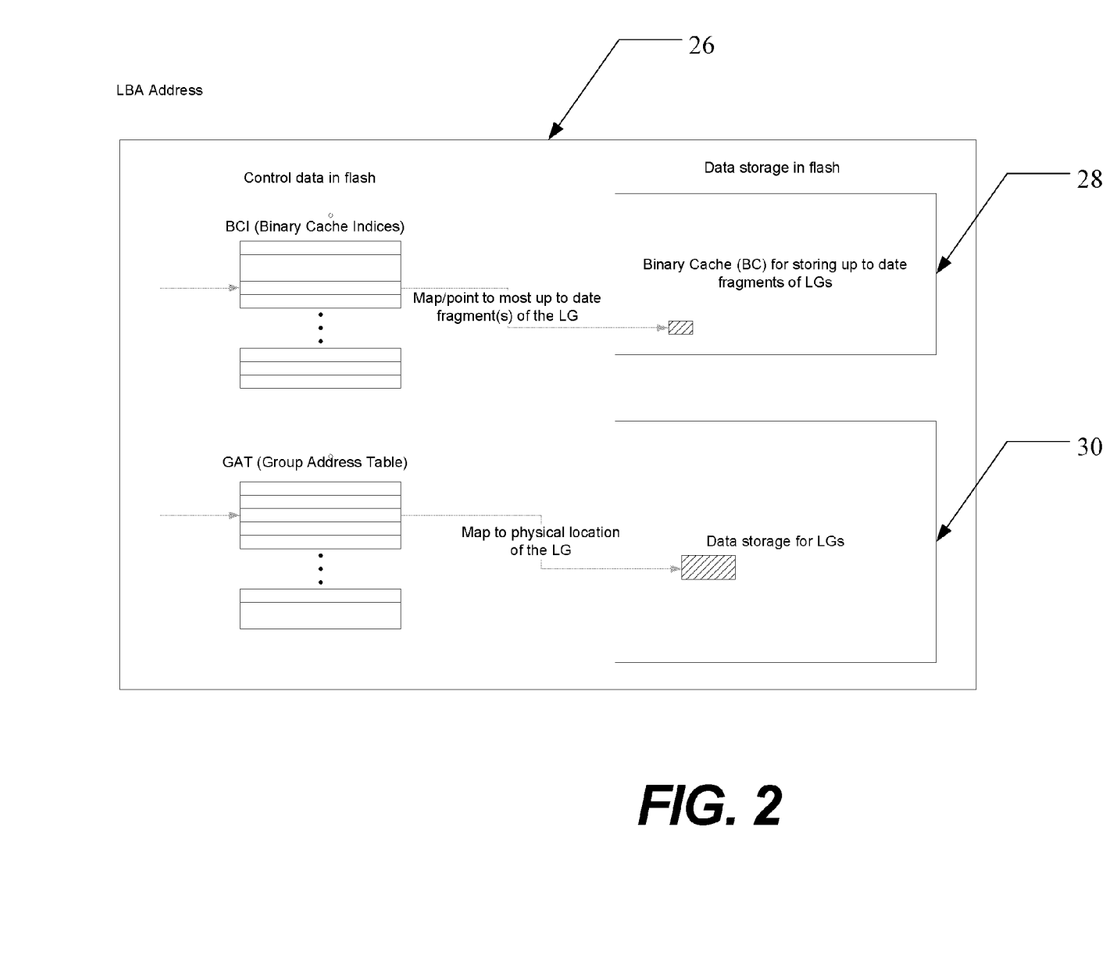
FIG. 2 is an expanded block diagram of a memory within the memory system.

Control data may include data related to managing and/or controlling access to data stored in memory 26. The binary cache 28 may store up-to-date fragments of the logical groups (LGs). The main storage may comprise the data storage for the LGs. Control data may be used to manage the entries in memory, such as entries in binary cache 28 and main storage 30, as shown in FIG. 2. For example, a binary cache index (BCI) may receive a Logical Block Address (LBA), and may map/point to the most up to date fragment(s) of the LG in binary cache 28. The GAT may receive the LBA address and map to the physical location of the LG in the main storage 30.

In flash memories employing a binary cache (such as binary cache 28), the atomic unit of programming in the binary cache is a physical page. The restriction of programming a full physical is overcome by partial page programming, as discussed above. Partial page programming enables programming of less than the physical page, such as a programming granularity as small as an Error Correction Coding (ECC) page.

Partial page programming uses the notion of a "write step", which is the maximum programming step size as a multiple of a predetermined amount. In one embodiment, the predetermined amount is the ECC page so that the write step may be multiples of the ECC page. Typically, the write step is selected as a fixed size (and is not changeable during the operation of the storage device). A smaller fixed size for the write step has certain benefits and drawbacks, as does a larger fixed size for the write step. Depending on the usage and the fragment length, a smaller fixed size for the write step results in more programming steps for a single command. Conversely, a larger fixed size for the write step potentially results in more invalid data and frequent compactions. So, there is a trade-off between command latency, performance and endurance with a fixed write step size. This problem is magnified with larger physical page sizes. Since the media manager does not have knowledge of the physical page size, it operates purely on the write step.

Figure 3A:
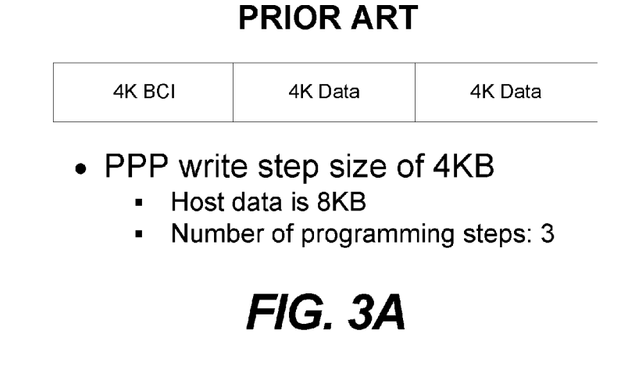
FIGS. 3A-C illustrate prior art partial page programming with a fixed size for the write step.
Figure 3B:
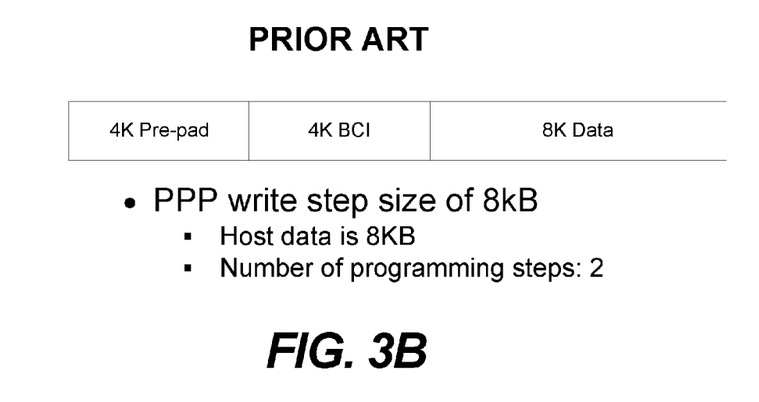
Figure 3C:
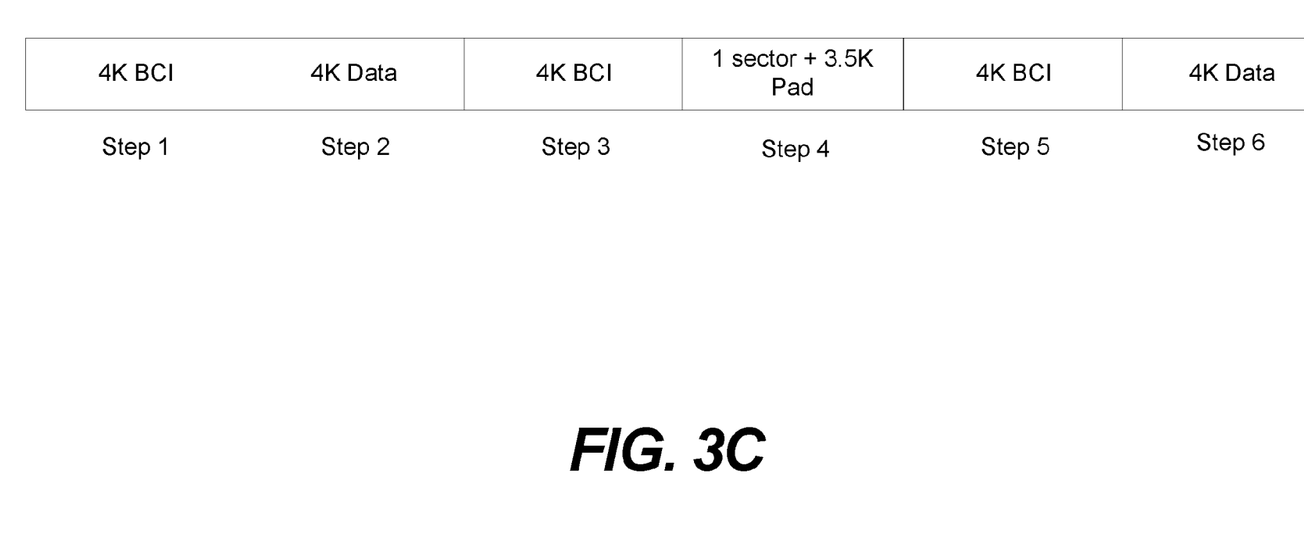

FIGS. 3A-C illustrate prior art partial page programming with a fixed size for the write step. FIG. 3A is an example of a physical page size of 16 kB, with random 8 kB writes with 4 kB BCI (with every write is to a different BCI in the same zone). Thus, FIG. 3A illustrates 8 kB of host data (data sent by the host system 10 and received by the storage system 12 for writing in memory 26). The controller 16 of the storage system 12 may determine that the BCI be written to cache. The BCI may be written before the new fragment, hence the name 'BCI pre-pad'. BCI pre-pad may reduce one fragment write to 4 KB program. Further, the data (fragment and BCI) may be held without programming (transfer and program, or program only) unless there is more to program. The storage device can wait to obtain a full page. In the case of the physical page being 16 KB in size, there will be one program per 2 fragments, if nothing else changes.

FIG. 3A further shows that the fixed size for the write step is 4K. Partial page programming with the 4K write step size requires 3 separate programming steps: 4K of host data; 4K of host data; and 4K of BCI.

Similar to FIG. 3A, FIG. 3B includes 8K of host data and 4K of BCI. However, FIG. 3B has a fixed size for the write step of 8K. This fixed write step size results in fewer programming steps (two versus three); however, one of the programming steps is pre-padded with 4K of data. The padded 4K of data is wasted space. Thus, the reduction in the number of programming steps is offset by the potential for the need to store wasted space.

FIG. 3C illustrates mixed mode command lengths, with 4 kB, 1 sector, and 4 kB, in that order. Similar to FIG. 3A, the fixed size for the write step is 4K. The writes illustrated in FIG. 3C will have: (4 kB Data+4 kB BCI)+(1-sector+4 kB BCI)+(4 kB+4 kB BCI). There are a total number of six programming steps, with 3.5 kB padded for the 1-sector case.

In one aspect of the invention, the selection of the size of the write step is variable. The selection may be based on at least one aspect of the storage device (such as being based on at least one dynamic aspect of the storage device). For example, the selection may be based on how much data to store using partial page programming (e.g., how much host data to store using partial page programming and/or how much BCI to store using partial page programming).

The media management layer (MML) firmware of the storage device 12 may identify how much data is to be stored using partial page programming. As discussed above, there are different types of data that may be stored using partial page programming, such as host data and BCI. The media management layer firmware may identify how much host data and/or BCI is to be stored. In particular, certain protocols, such as Small Computer System Interface (SCSI) and Serial Advanced Technology Attachment (SATA), provide the command length of the host data beforehand (such as in a field of the command). So that, the media management layer firmware may be aware of the amount of host data in the command for partial page programming. Given that the media management layer is command aware of the amount of host data for partial page programming, the media management layer may select the write step size based on the amount of host data. As another example, the media management layer firmware may identify how much BCI data is to be stored.

Given the ability to vary the write step size, the media management layer firmware may reduce or optimize the number of programming steps. In this way, the media management layer firmware may maintain knowledge of the physical page size in relation to how many write steps are required for the current command received from the host. With this knowledge, the media management layer firmware may reduce or optimize the number of programming steps required to complete the current command. Reducing the number of programming steps for any given command may improve performance of the memory system. Moreover, varying the write step size may reduce the padding necessary when partial page programming, as discussed in more detail below. Reduced padding may leave less invalid data inside a block, so that compactions will be more efficient and will improve endurance.

Figure 4A:
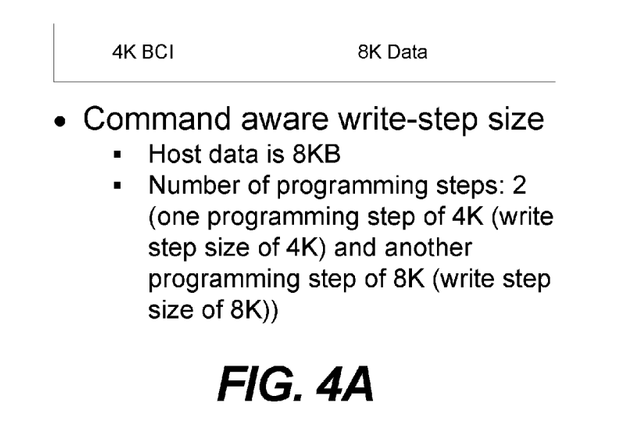
FIGS. 4A-C illustrate partial page programming with a variable size for the write step.
Figure 4B:
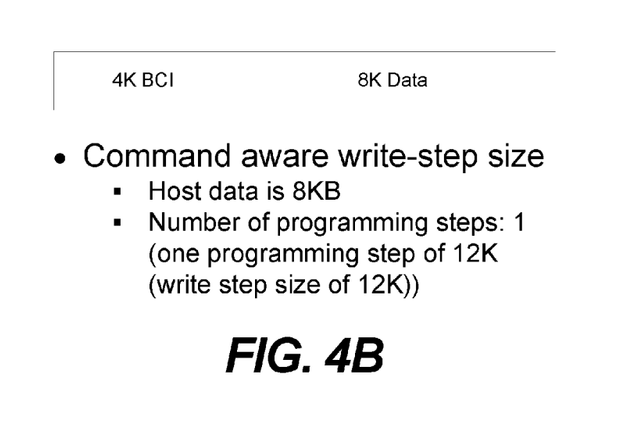
Figure 4C:
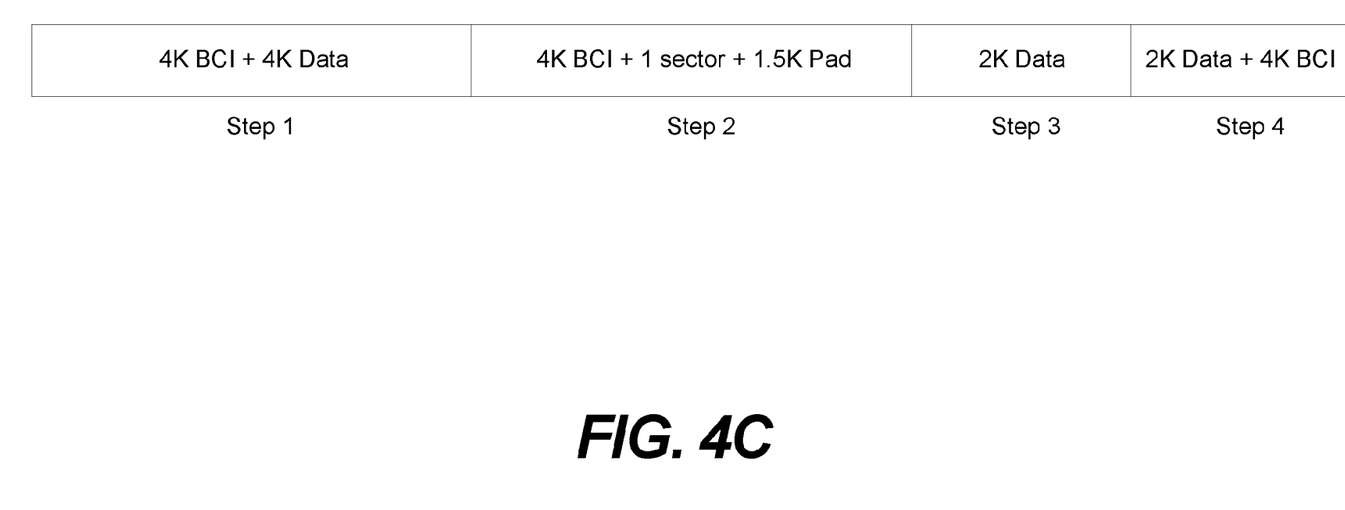

FIGS. 4A-C illustrate partial page programming with a variable size for the write step. Similar to FIGS. 3A-B, 8K of host data and 4K of BCI are written. The MML firmware may select one of multiple write step sizes. The selection by the MML firmware may attempt to reduce or optimize the number of programming steps and/or reduce the amount of wasted space written. The selection may be based on the amount of data to write to the binary cache 28 (including the amount of host data and/or BCI) and the location of where the data is written (including whether the data is being written in the same zone or different zones). FIGS. 4A-B illustrate two different selections of the write step. In FIG. 4A, there are two selections for the write step: a first selection of 8K for the write step (in order to write the 8K of host data); and a second selection of 4K for the write step (in order to write the 4K of BCI). FIGS. 4A-B are provided merely for illustration purposes. Selections of other variable write steps are contemplated.

In one embodiment, different write step sizes may be selected for different types of data. For example, the MML firmware of the storage device 12 may store the host data in the binary cache 28 in one programming step and store the BCI in the binary cache 28 in a separate programming step. In this example, the MML firmware may select one size of the write step based on the amount of data received from the host system. As illustrated in FIG. 4A, the write step size selected to store the host data into the binary cache 28 is 8 kB (so that only one programming step is needed to store the 8 kB of host data). Moreover, the MML firmware may select another size of the write step based on the amount of BCI to be written to binary cache 28. As illustrated in FIG. 4A, the write step size selected to store the BCI into the binary cache 28 is 4 kB (so that only one programming step is needed to store the 4 kB of BCI).

In an alternate embodiment, a single write step size is selected for different types of data. For example, FIG. 4B illustrates a single selection for the write step: a selection of 12K for the write step (in order to write the 8K of host data and the 4K of BCI).

FIG. 4C illustrates mixed mode command lengths similar to FIG. 3C with 4 kB, 1 sector, and 4 kB, in that order. For the first and second write, the size of the variable write step is selected to be 8 kB. For the third write, the size of the variable write step may be selected to be 6 kB. For the 2 kB tail at the end of the page, the size of the variable write step may be 2 kB. In total, the number of programming steps is 4, with 1.5 kB padded for 1-sector data. Comparing FIG. 3C (using a fixed write step size) with FIG. 4C (using a variable write step size), FIG. 4C illustrates that using the variable write step size reduces the number of programming steps and the amount of padding (invalid data), thereby making for a more efficient use of binary cache block space.

Figure 5:
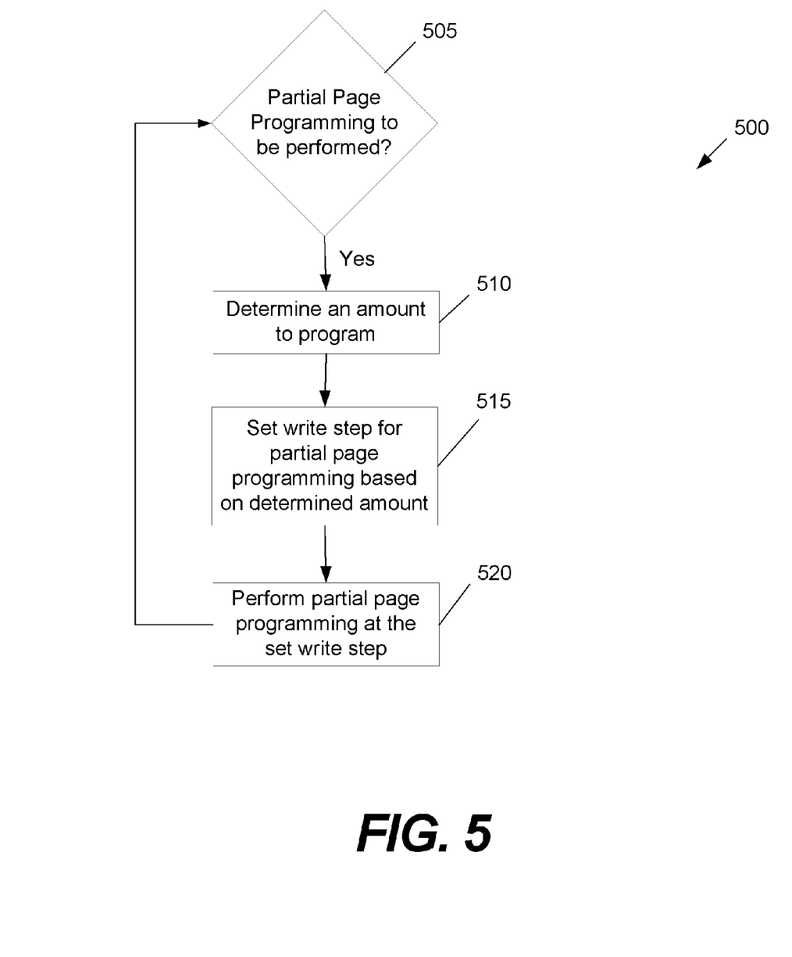
FIG. 5 is a flow chart for performing partial page programming with a variable write step.

Referring to FIG. 5, there is shown a flow chart 500 for performing partial page programming with a variable write step. At 505, it is determined whether partial page programming is to be performed. If it is determined to perform partial page programming, at 510, an amount to program via partial page programming is determined. At 515, the write step is set based on the determined amount. As discussed above, the write step may be variable based on one or more factors, including the amount to program using partial page programming. Finally, at 520, the partial page programming is performed at the set write step. Performing the partial page programming may include, on the controller side, the controller generating commands, and sending the commands and data to the memory in order for the memory to program the data via the partial page programming, and on the memory side, the memory receiving the commands and data and performing the partial page programming of the data.

Figure 6:
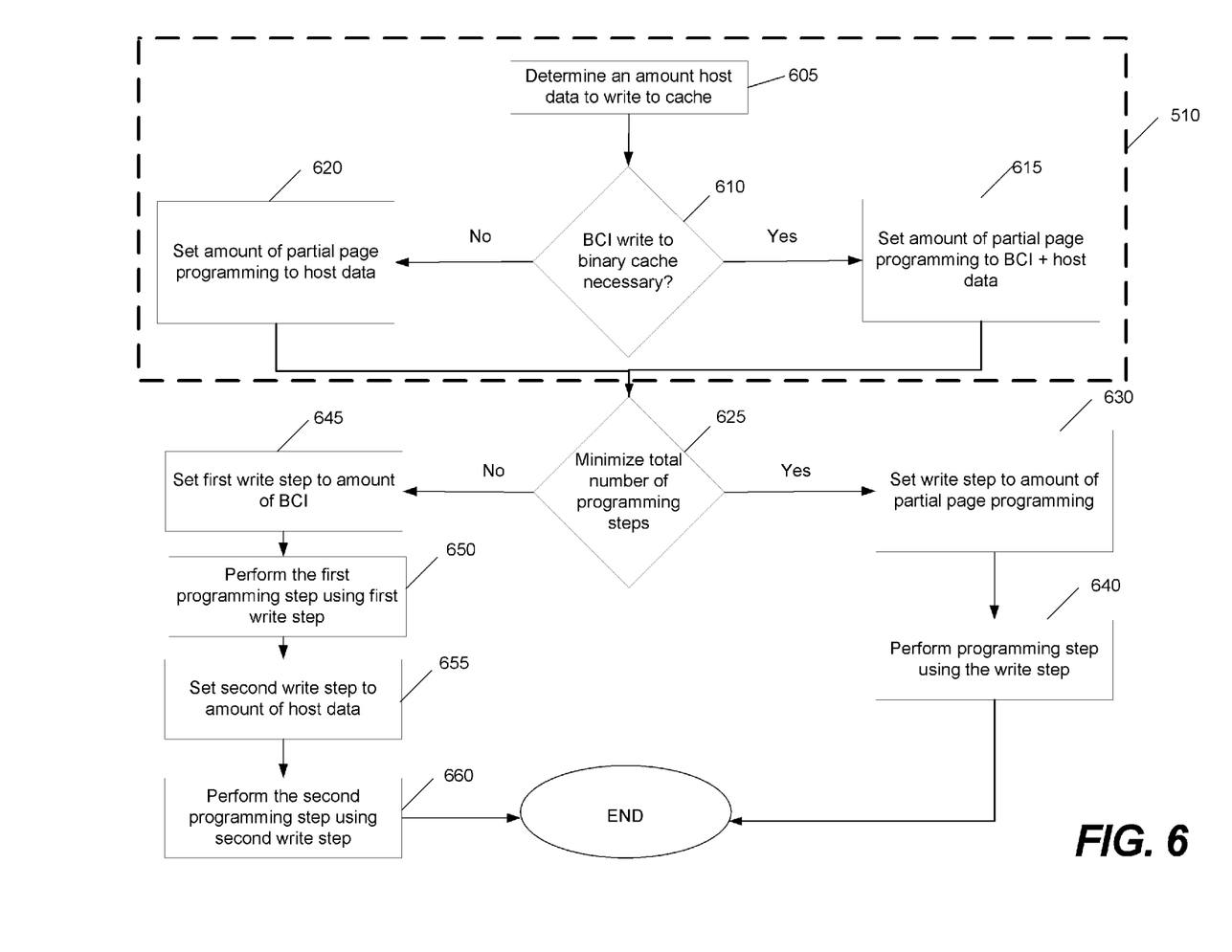
FIG. 6 is a flow chart expanding on different blocks in FIG. 5.

FIG. 6 is an expansion of blocks 510, 515 and 520 of the flow chart 500 depicted in FIG. 5. At 605, the amount of host data to write to binary cache is determined. At 610, it is determined whether a BCI write to binary cache is necessary. If the BCI write to binary cache is necessary, at 615, the amount to write to binary cache is the amount of host data plus the BCI. If the BCI write to binary cache is not necessary, at 620, the amount to write to binary cache is the amount of host data.

At 625, it is determined how to minimize the number of programming steps. If the write to the binary cache is in different zones, multiple writes may be necessary (such as, for example, the two programming steps illustrated at 650 and 660). If multiple writes are necessary, the size of the write step is set multiple times. FIG. 6 shows setting two different write steps and two programming steps merely for illustration purposes. At 645, the first write step is set to the amount of BCI. At 650, the first programming step is performed using the first write step. At 655, the second write step is set to the amount of host data. At 660, the second programming step is performed using the second write step. If a single write may be performed, at 630, the write step is set to the amount of the partial page programming, and at 640, the programming step is performed using the write step set.

Figure 7A:
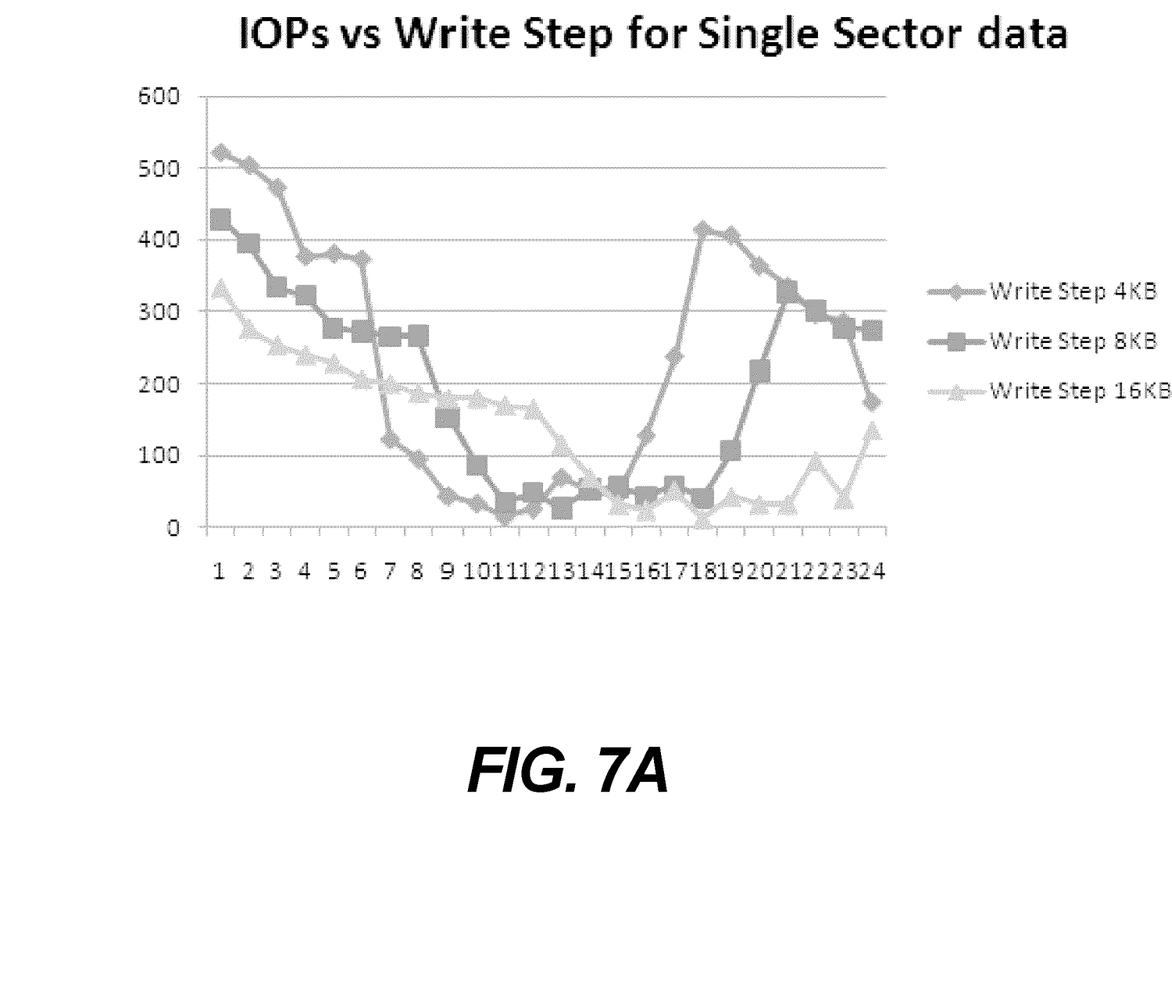
FIG. 7A is a graph of Input/Output Operations per Second (IOPs) versus write step for a single sector of data.
Figure 7B:
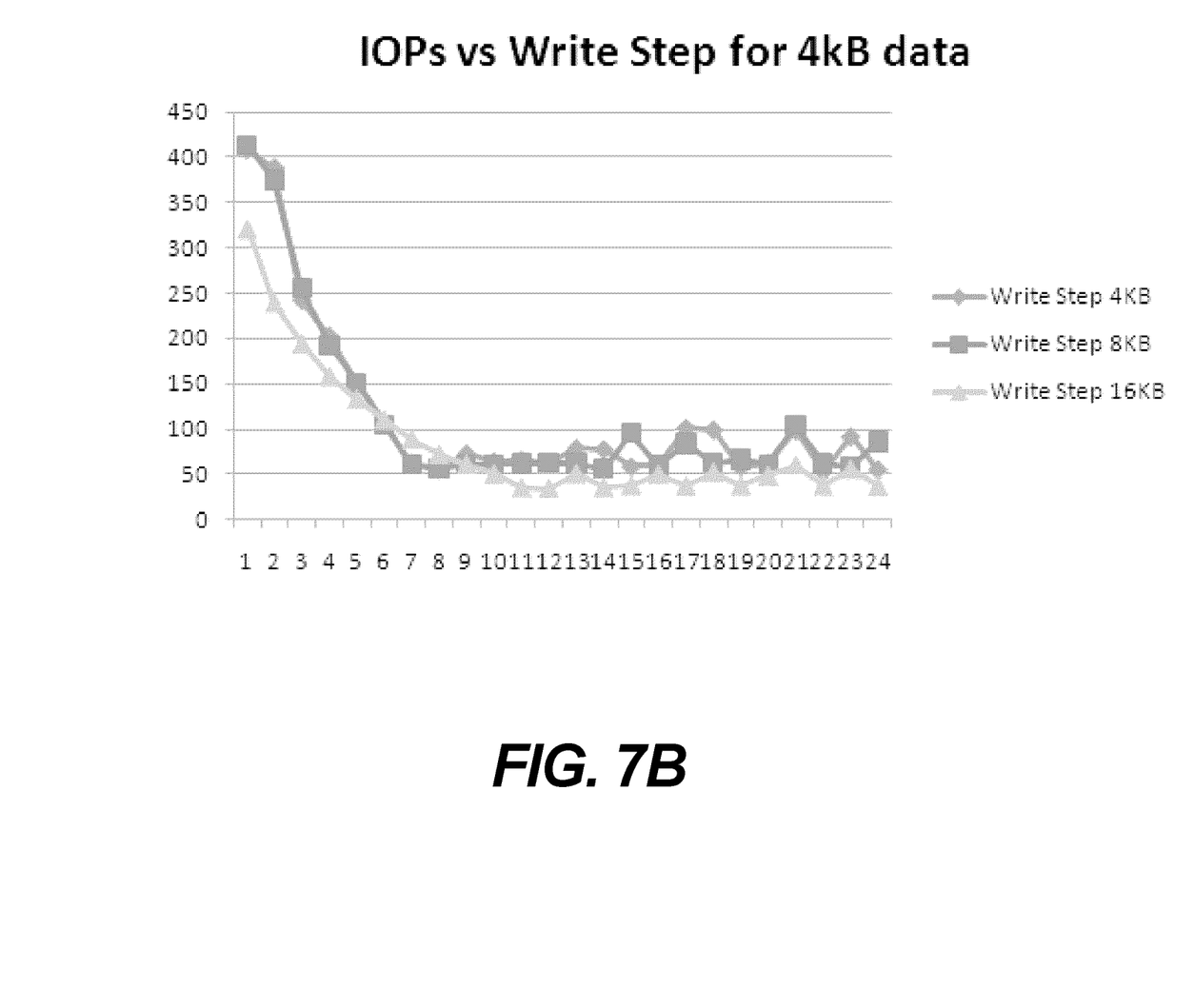
FIG. 7B is a graph of Input/Output Operations per Second (IOPs) versus write step for 4 kB of data.

FIG. 7A illustrates a graph of Input/Output Operations per Second (IOPs) versus write step for a single sector of data. FIG. 7B illustrates a graph of Input/Output Operations per Second (IOPs) versus write step for 4 kB of data. FIGS. 7A-B are for is for a 24 nM feature length of a 64 Gb single die memory device. 24 nM is merely an example of the feature length; other feature lengths are contemplated. Likewise, other size memory devices are contemplated. Further, FIGS. 7A-B use write step sizes of 4 kB, 8 kB and 16 kB, and illustrate with command aware partial page programming that the best write step may be dynamically selected so that the number of programming steps are optimized. That is, for the single sector case illustrated in FIG. 7A, command aware partial page programming may result in the curve corresponding to write step 4 kB.

Figure 8:
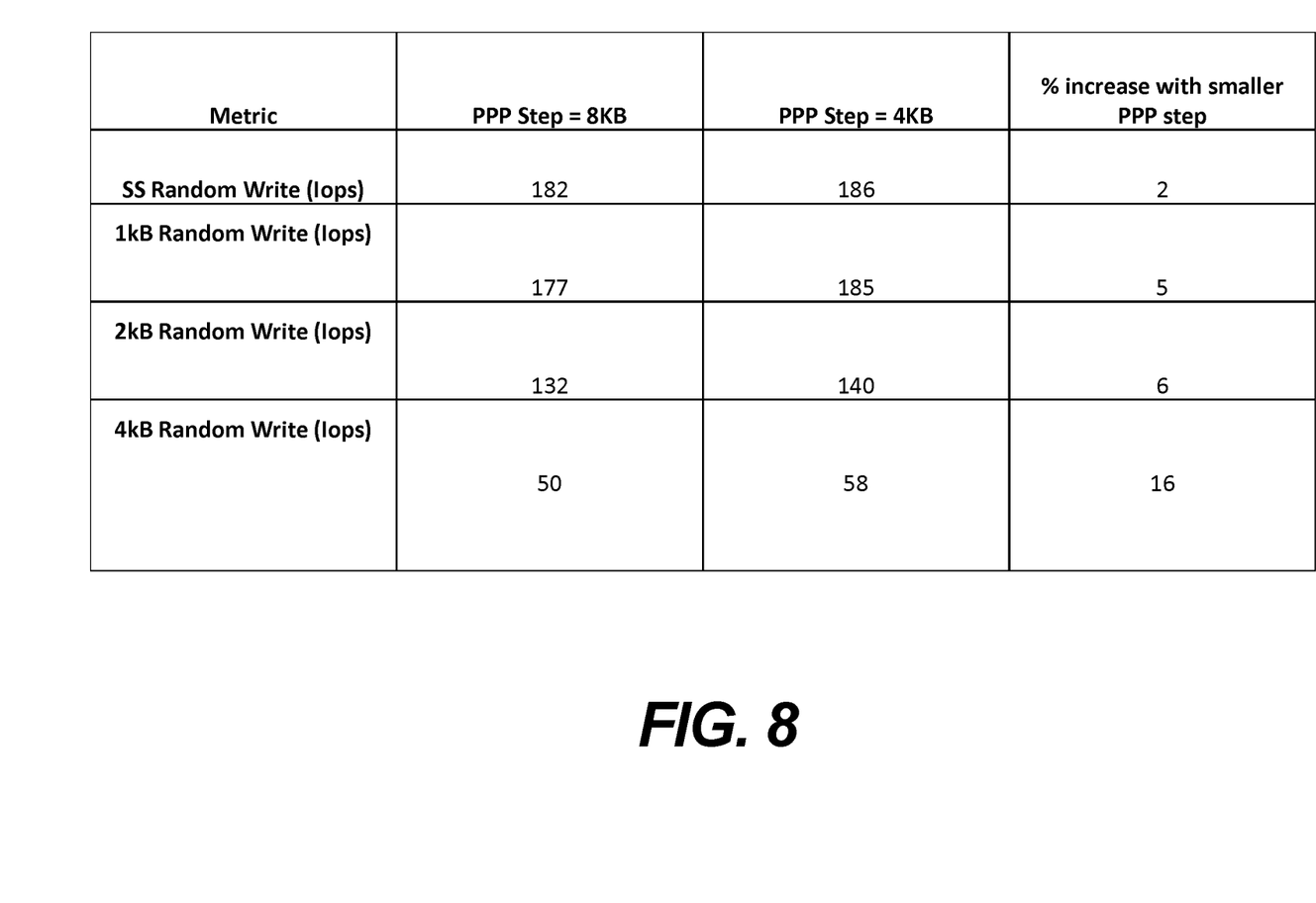
FIG. 8 is a table illustrating sustained random write performance for 8 kB and 4 kB fixed write step sizes.

FIG. 8 is a table illustrating sustained random write performance for 8 kB and 4 kB fixed write step sizes (measurements taken on a 24 nm 64 Gb single die product). In high performance products, sustained write performance (measured in a localized logical range) may be governed by the frequency of compactions and the burst speed at which binary cache can be written to. FIG. 8 illustrates input/output operations per second (Iops) for different random writes, such as Single Sector (SS) random write, a 1 kB random write, a 2 kB random write, and a 4 kB random write. Iops is a method by which to test improvement of operations of a memory device. As shown in FIG. 8, command aware partial page programming reduces both the number of programming steps and the number of compactions.

Accordingly, the method and system may be realized in hardware, software, or a combination of hardware and software. The method and system may be realized in a centralized fashion in at least one electronic device (such as illustrated in storage device 12 in FIG. 1) or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents.

We claim:

1. A storage device comprising:
a memory; and
a controller in communication with the memory and configured to:
determine an amount of data to write by partial page programming;
determine whether to write the data in a single step or multiple write steps;
in response to determining to write the data in multiple write steps:
dynamically select, based on the determined amount of data and from a plurality of predetermined write steps, the multiple write steps to write by partial page programming, and
perform the partial page programming in the memory with the dynamically selected multiple write steps in order to write the data to the memory;
in response to determining to write the data in the single write step:
dynamically select, based on the determined amount of data, the single write step to write the amount by partial page programming, and
perform the partial page programming in the memory with the dynamically selected single write step in order to write the data to the memory.

2. The storage device of claim 1, wherein the plurality of predetermined write steps are multiples of an Error Correction Coding (ECC) page.

3. The storage device of claim 1, wherein the controller is configured to select the single write step by selecting the predetermined write step that is closest to but not less than the amount to write by partial page programming.

4. The storage device of claim 1, wherein the amount comprises a first amount of data of a first type and a second amount of data of a second type.

5. The storage device of claim 4, wherein the controller is configured to determine the first amount to write by partial page programming by:
receiving host data from a host device for writing to the memory;
determining that the host data is of the first type; and
determining an amount of the host data as the first amount of data of the first type.

6. The storage device of claim 5, wherein the host data is received in a host command from the host device; and
wherein the controller is configured to determine the amount of host data by examining the host command.

7. The storage device of claim 4, wherein the controller is configured to determine the second amount to write by partial page programming by determining whether binary cache index is to be written to a binary cache in the memory.

8. The storage device of claim 4, wherein the controller is configured to determine the first amount of data of the first type and the second amount of data of the second type to write by partial page programming by:
receiving host data from a host device for writing to the memory;
determining that the host data is of the first type;
determining an amount of the host data as the first amount of data of the first type;
determining whether binary cache index is to be written to a binary cache in the memory; and
if it is determined that the binary cache index is to be written to the binary cache, determining an amount of the binary cache index as the second amount of data of the second type.

9. The storage device of claim 4, wherein the controller is configured to determine the first amount of the first type and the second amount of data of the second type to write by partial page programming by determining a host data amount of host data to write by partial page programming and a binary cache index (BCI) amount of binary cache index to write by partial page programming; and
wherein the controller is configured to dynamically set the multiple write steps by:
setting a host data write step that is closest to but not less than the host data amount; and
setting a BCI write step that is closest to but not less than the BCI amount.

10. The storage device of claim 1, wherein the controller is configured to determine whether to write the data in a single step or multiple write steps by determining whether the data is to be written in different sections of the memory.

11. The storage device of claim 10, wherein the data comprises control data and host data;
wherein the amount of data comprises a control data amount of control data and a host data amount of host data;
wherein the controller is configured to determine whether the data is to be written in different sections of the memory by determining that the control data is to be written in a different zone than the host data; and in response to determining that the control data is to be written in a different zone than the host data, the controller is configured to:
  select the predetermined write step as a control data write step that is closest to but not less than the control data amount to write by partial page programming;
  perform partial page programming with the control data write step to write the control data;
  select the predetermined write step as a host data write step that is closest to but not less than the host data amount to write by partial page programming; and
  perform partial page programming with the host data write step to write the host data;
in response to determining that the control data is to be written in a same zone as the host data:
  select the predetermined write step as the single write step that is closest to but not less than the amount to write by partial page programming;
  perform partial page programming with the single write step to write the data.

12. A method for partial page programming in a memory of a storage device, the method comprising:
  performing in the memory of the storage device:
    determining an amount of data to write by partial page programming;
    determining whether to write the data in a single step or multiple write steps;
    in response to determining to write the data in multiple write steps:
      dynamically selecting, based on the determined amount of data and from a plurality of predetermined write steps, multiple write steps to write by partial page programming, and
      performing the partial page programming in the memory with the dynamically selected multiple write steps in order to write the data to the memory;
    in response to determining to write the data in the single write step:
      dynamically selecting, based on the determined amount of data, the single write step to write the amount by partial page programming, and
      performing the partial page programming in the memory with the dynamically selected single write step in order to write the data to the memory.

13. The method of claim 12, wherein the plurality of predetermined write steps are multiples of an Error Correction Coding (ECC) page.

14. The method of claim 12, wherein selecting the single write step comprises selecting the predetermined write step that is closest to but not less than the amount to write by partial page programming.

15. The method of claim 12, wherein the amount comprises a first amount of data of a first type and a second amount of data of a second type.

16. The method of claim 15, wherein determining the first amount to write by partial page programming comprises:
  receiving host data from a host device for writing to the memory; and
  determining that the host data is of the first type; and
  determining an amount of the host data as the first amount of data of the first type.

17. The method of claim 16, further comprising receiving, from a host device, the host data in a host command; and
  wherein determining the amount of host data comprises examining the host command.

18. The method of claim 15, wherein determining the second amount to write by partial page programming comprises determining whether binary cache index is to be written to a binary cache in the memory.

19. The method of claim 15, wherein determining the first amount of data of the first type and the second amount of data of the second type to write by partial page programming comprises:
  receiving host data from a host device for writing to the memory;
  determining that the host data is of the first type;
  determining an amount of the host data as the first amount of data of the first type;
  determining whether binary cache index is to be written to a binary cache in the memory; and
  if it is determined that the binary cache index is to be written to the binary cache, determining an amount of the binary cache index as the second amount of data of the second type.

20. The method of claim 15, wherein determining the first amount of the first type and the second amount of data of the second type to write by partial page programming comprises determining a host data amount of host data to write by partial page programming and a binary cache index (BCI) amount of binary cache index to write by partial page programming; and
  wherein dynamically setting the multiple write steps comprises:
    setting a host data write step that is closest to but not less than the host data amount; and
    setting a BCI write step that is closest to but not less than the BCI amount.

21. The method of claim 12, wherein determining whether to write the data in a single step or multiple write steps comprises determining whether the data is to be written in different sections of the memory.

22. The method of claim 21, wherein the data comprises control data and host data;
  wherein the amount of data comprises a control data amount of control data and a host data amount of host data;
  wherein determining whether the data is to be written in different sections of the memory comprises determining that the control data is to be written in a different zone than the host data; and
  in response to determining that the control data is to be written in a different zone than the host data:
    selecting the predetermined write step as a control data write step that is closest to but not less than the control data amount to write by partial page programming;
    perform partial page programming with the control data write step to write the control data;
    select the predetermined write step as a host data write step that is closest to but not less than the host data amount to write by partial page programming; and
    perform partial page programming with the host data write step to write the host data;
  in response to determining that the control data is to be written in a same zone as the host data:
    select the predetermined write step as the single write step that is closest to but not less than the amount to write by partial page programming;
    perform partial page programming with the single write step to write the data.

* * * * *